United States Patent [19]
Weaver et al.

[11] Patent Number: 5,821,438
[45] Date of Patent: Oct. 13, 1998

[54] DEVICE TO ALTER AN ATMOSPHERE IN AN AUTOCLAVE

[75] Inventors: Scott Andrew Weaver, Scotia; Raymond Grant Rowe, Niskayuna, both of N.Y.

[73] Assignee: General Electric Company, Schenectady, N.Y.

[21] Appl. No.: 950,081

[22] Filed: Oct. 14, 1997

[51] Int. Cl.[6] .................................................. G01N 19/00
[52] U.S. Cl. .......................................................... 73/865.6
[58] Field of Search .......................... 73/865.6; 422/242, 422/26

[56] References Cited

U.S. PATENT DOCUMENTS

| | | | |
|---|---|---|---|
| 3,088,180 | 5/1963 | Lauterbach | 422/26 |
| 4,711,131 | 12/1987 | Hopkins | 73/865.6 |
| 4,944,919 | 7/1990 | Powell | 422/26 |
| 5,109,104 | 4/1992 | Marks | 528/313 |
| 5,723,090 | 3/1998 | Beerstecher et al. | 422/26 |

*Primary Examiner*—Robert Raevis
*Attorney, Agent, or Firm*—Ernest G. Cusick; Noreen C. Johnson

[57] ABSTRACT

An introduction system for introducing an atmosphere into an interior of an autoclave alters an existing atmosphere. The introduction system comprises at least one source of actuating gas; an actuating mechanism, a pressure barrier that separates an interior of the autoclave from ambient exterior atmosphere; and a containment vessel that is located at least partially in the interior of the autoclave. The containment vessel comprises a plurality of walls, at least one of the walls comprising a release wall structure of the containment vessel, a vapor producing material cavity, where the walls define the vapor producing material cavity; and an opening element. The opening element is movable by the opening actuator device. The release wall structure of the containment vessel is rapidly opened by the opening element to effect a rapid release of vapor producing material in the vapor producing material cavity into the interior of the autoclave. The autoclave is provided with at least an increased pressure, so a rapid release of vapor producing material in the vapor producing material cavity into the interior of the autoclave causes the vapor producing material to vaporize into a vapor, thus altering an atmosphere in the autoclave. The actuating mechanism comprises an opening actuator device. The at least one source of actuating gas in communication with the opening actuator device and flow from the at least one source of actuating gas is controlled by a control device.

24 Claims, 3 Drawing Sheets

DEVICE TO ALTER AN ATMOSPHERE IN AN AUTOCLAVE

FIELD OF THE INVENTION

The invention relates to a device to alter an atmosphere in an autoclave. In particular, the invention relates to a device to dynamically alter the atmosphere in a material testing autoclave.

BACKGROUND OF THE INVENTION

Autoclaves are vessels, normally constructed from a thick walled material, for example steel alloys or nickel alloys. An autoclave is used for carrying out testing or chemical reactions under at lease one of a controlled pressure, temperature and environment conditions. An autoclave can be used for testing and determining mechanical and other properties of materials, devices or systems.

Autoclaves are often provided with an ability to control an atmosphere to be the same as or approximate a working environment around a particular material, device or system that is to be tested. Thus, the particular material, device or system can have its properties tested and determined in actual work environment and atmospheres that will be encountered. It is desirable to determine the properties of the particular material, device or system in the work environment atmosphere, so parameters for the particular material, device and system can be and a design be provided for in accordance with the work environment atmosphere.

For example, but not limiting, autoclaves for testing mechanical property measurements may provide a steam atmosphere where a particular material, device or system will be subjected, during use, to steam. Further, the steam atmosphere is often coupled with a high temperature and pressures.

Typically, steam atmospheres in testing autoclaves, which measure mechanical properties, are characterized by a relatively low flow of steam into the autoclave. The relatively low flow of these steam atmospheres in testing autoclaves is almost quasi-static flow rates. These quasi-static flow rates are undesirable because in actual use, the particular material, device or system is often subjected to rapid increases in at least one of steam, temperature and pressure, which can not be simulated by a low or quasi-static flow rate autoclave.

Variations in atmospheres, for example steam, in testing autoclaves often require manual changes to a supply entering a vapor generator, such as a steam generator. Further, variations in atmospheres in a testing autoclave often require changing an effluent rate to alter a resident time of the vapor. Each of these procedures is slow and often inaccurate, both of which are, of course, undesirable.

Currently, fuel injectors have been proposed to increase the speed of the affluent rate and to avoid manual interaction with the testing autoclave. However, fuel injectors only permit small quantities of vapor, such as steam and water, to be injected into the autoclave. Accordingly, fuel injectors are not adequate for introducing vapors into testing autoclaves, especially where a large amount of vapor is needed in a relatively fast time period.

SUMMARY OF THE INVENTION

Therefore, it is desirable to provide an autoclave that overcomes the above mentioned, and other, disadvantages of prior art autoclaves.

Accordingly, it is desirable to provide an autoclave that includes an introduction system to alter an internal autoclave atmosphere in a fast, and accurate manner.

Further, it is desirable to provide an introduction system for introducing an atmosphere into an interior of an autoclave so as to alter an existing atmosphere. The introduction system comprises at least one source of actuating gas; an actuating mechanism, a pressure barrier that separates an interior of the autoclave from ambient exterior atmosphere; and a containment vessel that is located at least partially in the interior of the autoclave. The containment vessel comprises a plurality of walls, at least one of the walls comprising a release wall structure of the containment vessel, a vapor producing material cavity, where the walls defining the vapor producing material cavity; and an opening element. The opening element is movable by the opening actuating mechanism device. The release wall structure of the containment vessel is rapidly opened by the opening element to effect a rapid release of vapor producing material in the vapor producing material cavity into the interior of the autoclave. The autoclave is provided with at least one of an increased temperature and pressure, so a rapid release of vapor producing material in the vapor producing material cavity into the interior of the autoclave causes the vapor producing material to vaporize into a vapor, thus altering an atmosphere in the autoclave. The actuating mechanism comprises an opening actuating mechanism device. The at least one source of actuating gas in communication with the opening actuating mechanism device and flow from the at least one source of actuating gas is controlled by a control device.

These and other aspects, advantages and salient features of the invention will become apparent from the following detailed description, which, when taken in conjunction with the annexed drawings where like elements are indicated by like reference characters, disclose preferred embodiments of the invention.

BRIEF DESCRIPTION OF THE DRAWINGS

While the novel features of this invention are set forth in the following description, the invention will now be described from the following detailed description of the invention taken in conjunction with the drawings, in which.

DETAILED DESCRIPTION OF THE PREFERRED EMBODIMENTS

As embodied by the invention, an autoclave comprises an introduction system, which is designed to dynamically introduce a gas or vapor into an autoclave, further under controlled temperature and pressure conditions, for example in a testing autoclave. Thus, testing of a particular material, device or system under a controlled atmosphere with a particular vapor can be conducted.

An introduction system, as embodied by the invention, introduces a controlled atmosphere into an autoclave. The controlled atmosphere comprises any at least one desired gaseous or vapor constituent, including but not limited to steam. For purposes of ease of discussion, the following description of the invention will discuss the vapor in the controlled atmosphere as steam. However, this is merely exemplary, and is not meant to limit the invention in any manner. Any other desired vapor for the controlled atmosphere can be introduced into the testing autoclave, as embodied by the invention.

Briefly, as embodied by the invention, a vapor, such as but not limited to steam, is supplied to the testing autoclave at a desired, preferably elevated, temperature by an introduction system. Steam is provided into the autoclave by opening a release wall section of a containment vessel. The containment vessel is mounted in conjunction with and in communication with the testing autoclave.

The introduction system, as embodied by the invention, comprises a containment vessel that is positioned with and mounted in conjunction to the testing autoclave. The containment vessel is in conjunction with the testing autoclave so that contents of the containment vessel (to be described hereinafter) can be provided to an interior of the testing autoclave. The introduction system for introducing steam permits a known controlled and predetermined amount of vapor producing material, such as water that forms steam, to be introduced inside the testing autoclave. The introduced vapor producing material is vaporized by an internally controlled temperature of the testing autoclave.

Figure 1:
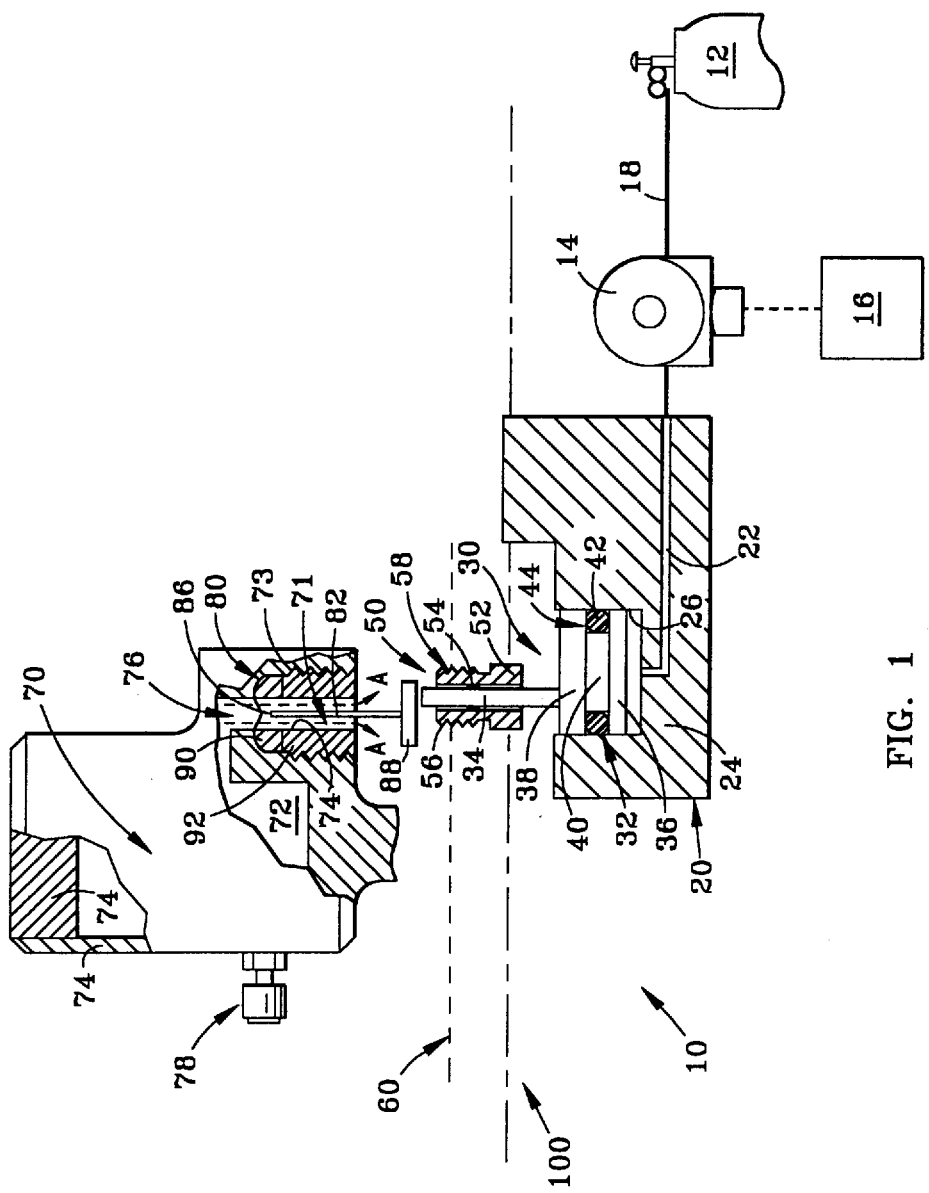
FIG. 1 is a partial sectional schematic illustration of an introduction system to alter an atmosphere in an autoclave, as embodied by the invention.

The introduction system 10, as illustrated in FIG. 1, comprises at least one source of actuation gas 12, for example but not limited to a cylinder of gas. The actuating gas does not enter the testing autoclave 100. The actuating gas is preferably an inert gas, such as but not limited to nitrogen, so that actuating gas will not impair or alter the introduction of a vapor into the testing autoclave 100. The actuating gas is compatible with materials of the introduction system 10, and is non-reactive with constituents of the introduction system 10. The actuating gas is preferably a non-toxic gas. Further, the actuating gas can be that same as the vapor to be introduced into the testing autoclave 100, so the actuating gas will not adversely effect the atmosphere introduced into the testing autoclave 100.

The flow of gas from the source of actuation gas 12 is controlled with a solenoid 14. The solenoid 14 is controlled by an appropriate control device 16. The solenoid 14 and control device 16 comprise part of a control 11, and may be integrated into a single control-valve element. The control device 16 can take any appropriate form, such as but not limited to a computer, a microprocessor or an integrated circuit.

In the introduction system 10, as embodied by the invention, the control device 16 can be implemented as a single special purpose integrated circuit with a main or central processor. The central processor is dedicated to performing various functions and processes required by the introduction system 10. It will be appreciated by one skilled in the art that the control device 16 can also be implemented with a plurality of separate dedicated or programmable integrated or other electronic circuits or devices, for example but not limited to hardwired electronic or logic circuits or programmable logic devices, as known in the art. The control device 16 can also comprise a suitably programmed general purpose computer, such as but not limited to a microprocessor, microcontroller or other such processor device, which may be used alone or in combination with one or more peripheral processing devices. Further, a distributed processing architecture is preferred for a maximum and desirable data/signal processing capability and speed.

The control device 16 actuates the solenoid 14 to open flow passages (not illustrated) therein. Thus, gas flowing from the source of actuation gas 12 through conduit 18 passes through the solenoid 14. The actuating gas can then flow to an actuating mechanism 20.

The actuating mechanism 20 is provided with a gas passage 22 to communicate with and receive the gas flowing through the solenoid 14. The actuating mechanism 20 is mounted in conjunction and in communication with the testing autoclave 100.

The actuating mechanism 20 can be provided as a separate entity in mechanical communication with the testing autoclave 100 that can be connected to the testing autoclave 100 as in FIG. 1 formed connected to the testing autoclave 100, either in a removable or fixed fashion; or incorporated into the interior of the testing autoclave 100. If the actuating mechanism 20 is provided as a separate connected entity, appropriate connections must be made in order to communicate at least one of gas flow and opening motion an opening element 82 (to be described hereinafter) to the vapor containment vessel. If the actuating mechanism 20 is provided incorporated into the interior of the testing autoclave 100, the actuating mechanism 20 should comprise suitable connection fittings to the source of actuation gas 12.

A body 24 of the actuating mechanism 20 is formed from any appropriate material, which permits the gas passage 22 to be formed therein. Further, the body 24 of the actuating mechanism 20 is formed of a material that chemically resistant to the actuating gas. Further, the material for the body 24 of the actuating mechanism 20 is preferably non-corrosive, compatible and non-reactive with the actuating gas and vapor that is to be introduced into the testing autoclave 100. It should be noted that the vapor will not per se contact the actuating mechanism 20.

The actuating mechanism 20 comprises an opening actuator device 30. The opening actuator device 30 is mounted in a bore 26 formed in the body 24 of the actuating mechanism 20. The opening actuator device 30 comprises a pneumatically actuated piston 32 and a plunger 34 connected thereto.

The pneumatically actuated piston 32 of the opening actuator device 30 is mounted in the bore 26 for a sealed sliding motion. The pneumatically actuated piston 32 comprises a first plate 36, an intermediate portion 40, and a second plate 38. The first and second plates, 36 and 38, respectively, have a shape and circumference in close conformance with walls of the bore 26. The first and second plates, 36 and 38, respectively, be in sealed, sliding contact with the wall of the bore 26. Preferably the pneumatically actuated piston 32 comprises a solid element with the first and second plated 36 and 38, respectively, integral with one another.

The intermediate portion 40 of the pneumatically actuated piston 32 has a smaller cross-section than the first and second plates, 36 and 38, respectively. The smaller cross-section of the intermediate portion 40 allows at least one seal 42 to be placed between the first and second plates, 36 and 38, respectively. The seal 42, for example an O-ring seal, fits in a space 44 between the first and second plates, 36 and 38, respectively, juxtaposed to the intermediate portion 40. Thus, when the pneumatically actuated piston 32 is in the bore 26, the seal 42 is in sliding contact with the wall of the bore 26. Accordingly, actuating gas will be prevented from passing around the pneumatically actuated piston 32, and will not exit the actuating mechanism 20 into the testing autoclave 100.

The plunger 34 is connected to the second plate 38, either in an integral fashion as a single formed piece, or is removably connected to the second plate 38. The plunger 34 is formed from the same material as the second plate 38 of the pneumatically actuated piston 32 or from a different material. However, in any case, the plunger 34 of the actuating mechanism 20 is formed from a suitable hard material so as to withstand impacts without fracture, breakage or other failure.

The plunger 34 is mounted for sliding motion in a guide structure. The guide structure 50 permits plunger 34 to slidably reciprocate as a result of movement of the pneumatically actuated piston 32, as described hereinafter.

The guide structure 50 comprises a sleeve 52 and at least one seal 54, where the construction of the at least one seal 54 can take any appropriate seal construction. The sleeve 52 is connected to a pressure barrier 60 that ensures that the containment vessel 70 is isolated, and the contents of the containment vessel 70 remain within the testing autoclave 100. The pressure barrier 60 is one of: a part of an exterior wall of the testing autoclave 100; a part of an exterior wall of the testing autoclave 100; and a separate structure connected thereto.

The sleeve 52 of the guide structure 50 comprises threads 56 that are secured to the a threaded bore 58 of the pressure barrier 60, for example by threadably attaching the sleeve 52 to the barrier. Alternatively, the sleeve 52 can be press fit, welded to, or mechanically connected to the pressure barrier 60 by an appropriate connector (not illustrated).

The plunger 34 extends through the sleeve 52 and the at least one seal 54 of the guide structure, so as to extend across the pressure barrier 60. Thus, movement transmitted from the pneumatically actuated piston 32 is transferred from one side of the pressure barrier 60 to another side of the pressure barrier 60. An end of the plunger 34 remote from the pneumatic piston 32, upon movement, contacts, an opening element 82 of the containment vessel 70 in the introduction system 10, as embodied by the invention.

The containment vessel 70 comprises a vapor producing material cavity 72 in which vapor producing material that will be released into the testing autoclave 100 is stored. The vapor producing material cavity 72 is sealed by walls 74 of the containment vessel 70 and a release wall section 76 of the vapor producing material cavity. The shape of the containment vessel 70 as illustrated is exemplary, and not limiting of the invention. Any shape of the containment vessel 70 is within the scope of the invention.

The containment vessel 70 also comprises a fill unit 78. The fill unit 78 permits the vapor producing material cavity 72 to be filled with the a vapor producing material. The fill unit 78 may take any appropriate fill structure, such as but not limited to one of a fill plug that is capped by a closure, a self sealing membrane through which the a vapor producing material can be passed, and fill valve structures. The exact nature and structure of the fill unit 78 is not critical to the introduction system 10, as long as the vapor producing material cavity 72 can be filled with a vapor producing material. Therefore, the introduction system 10 can be reused with an appropriate vapor producing material being placed within the vapor producing material cavity.

The release wall structure 76 of the containment vessel 70 provides a sealed vapor producing material cavity 72 in the containment vessel. FIG. 1 illustrates the release wall structure 76 as a rupture element 80, such as a foil, disk, sheet of material or piercable element. As illustrated, the rupture element 80 extends across a bore 71 in the containment vessel 70 and isolates the vapor producing material cavity.

The containment vessel opening element 82 is illustrated in FIG. 1 as an elongated element with a pointed pin-like end, which can pierce the rupture element 80. The opening element 82 is formed of a suitable hard material that does not break, bend or otherwise fail upon contact with the rupture element 80. Further, the opening element 82 is also provided with a shape at end 86 to maintain the rupture element 80 away from the opening element 82 when the end 86 extends through the rupture element. For example, and in no way limiting of the invention, the end of an opening element 82*a* may be provided with one of a cruciform shape 86*a* and a through passage or bore 86*b*, as illustrated in FIGS. 2 and 3, respectively.

Figure 2:
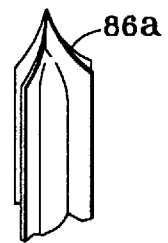
FIG. 2 is a side perspective view of an end of an opening element, as embodied by the invention.

In FIG. 2, the pierceable element and portions of the pierceable element are maintained away from the opening element after the opening element passes through the pierceable element to provide a path for vapor by the cruciform shape of the end 86*a*.

Figure 3:
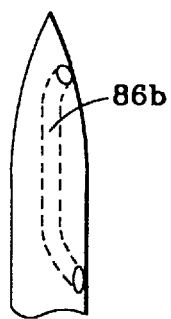
FIG. 3 is a side perspective view of an end of another opening element, as embodied by the invention.

In FIG. 3, the one end of the opening element comprising a through passage 86*b* from an upper part of the end to a position intermediate the opening element. Upon movement of the opening element, the through passage end of the opening element passes through the pierceable element. The through passage 86*b* provides a flow path across the pierceable element to provide a path for vapor producing material in the vapor producing material cavity of the containment vessel to flow into an interior of the autoclave The bore 71 in the containment vessel 70 defines a flow path, which is represented by Arrows A, for the vapor producing material in the vapor producing material cavity 72 to enter the interior of the testing autoclave 100. Thus, the containment vessel opening element 82 must have a cross section that is less than a cross section of the bore 71, so that a passage defining the path A is formed.

Figure 4:
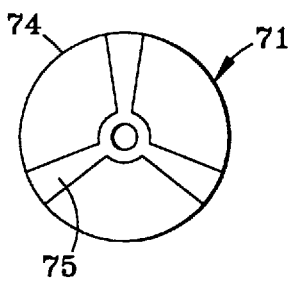
FIG. 4 is a top perspective view of a spacer to maintain an opening element spaced from walls of a containment vessel, as embodied by the invention.
Figure 5:
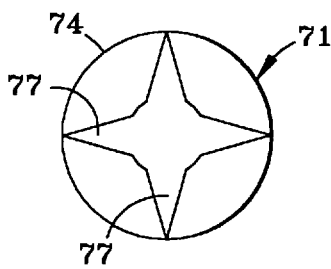
FIG. 5 is a top perspective view of fins to maintain an opening element spaced from walls of a containment vessel, as embodied by the invention.

The bore 71 can be provided with at least one spacer element 75 (FIG. 4) to position the containment vessel opening element 82 away from the walls 74 of the bore 71. Alternatively, the containment vessel opening element 82 can be provided with at least one fin 77 (FIG. 5) to position the containment vessel 70 opening device 30 away from the walls 74 of the bore 71, and to define the path A. Further, both at least one spacer 75 and the at least one fin 77 may be provided to maintain position the containment vessel opening element 82 away from the walls 74 of the bore 71.

The containment vessel opening element 82 may be secured by at least one of frictional engagement of the fins of containment vessel opening device 30 engaging the wall 74 of the bore 71, the frictional engagement of the spacer 75 and the containment vessel opening element 30, and held in the bore 71 by a confined area defined by one end of the containment vessel opening element 82 where it contacts the plunger 34 and the other end of the containment vessel opening element 82.

Figure 6:
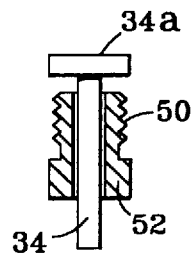
FIG. 6 is a side perspective view of an opening element, as embodied by the invention.

As illustrated, the containment vessel opening element 82 includes an end section 88 at the end of the containment vessel opening element 82 opposite the end 86. The shape of the end section 88 is preferably enlarged to assure contact with the plunger 34. However, the shape of the end section 88 is not critical to the invention as long as the end section 76 insures contact of the plunger 34 and the containment vessel opening element 82. Alternatively, the end section 88 may not be enlarged but the end of the plunger 34 proximate the containment vessel opening element 82 may be enlarged, as illustrated by element 34a in FIG. 6.

The release wall 74 structure, if formed as a rupture disk, is secured into the containment vessel 70 in a sealed fashion. As illustrated in FIG. 1, the release wall structure 76 comprises a rupture element 80, a rupture element holder 90 and a rupture element securing device 92.

The rupture element holder 90 and the rupture element securing device 92 are threaded into a threaded bore 73 in a wall 74 of the containment vessel 30, so as to securely hold the rupture element 80 in a reduced end of the threaded bore 73. The threading of the rupture element securing device 92 and the rupture element holder 90 will force the rupture element 80 into a sealing contact against an upper wall of the bore 73. This forcing of the rupture element 80 into a sealing contact against an upper wall 74 and will seal the rupture element 80 in the bore 73 and seal the vapor producing material cavity 72.

The rupture element 80 may be formed of any appropriate material that is non-reactive and non-corrosive with the vapor producing material in the vapor producing material cavity. For example, the rupture disk may be formed of at least one of a plastic, metal, metal alloy, composite material, ceramic, polymer or other material that can be opened by the containment vessel opening device 30. The rupture element 80 also possesses sufficient strength to remain intact under pressure of the vapor producing material in the vapor producing material cavity 72. Typically, the vapor producing liquid will have a vapor pressure at the test temperature that is substantially higher that the pressure within the interior of the autoclave 100. The rupture element 80 is also preferably deformable, at least in some degree, so the forcing of the rupture element 80 into a sealing contact against an upper wall 74 will deform the rupture element 80 and seal the rupture element 80 in the bore 71.

Figure 7:
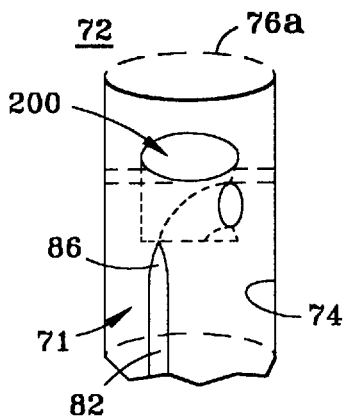
FIG. 7 is a side perspective view of a release wall structure, as embodied by the invention.
Figure 8:
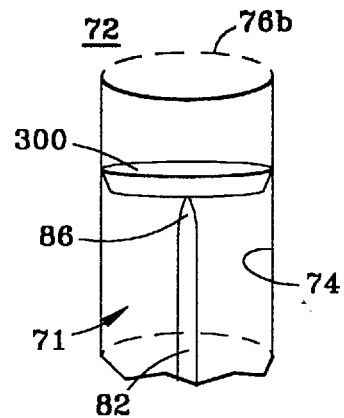
FIG. 8 is a side perspective view of another release wall structure, as embodied by the invention.

While the release wall structure 76 of the introduction system 10 has been described above with a rupture element 80, the release wall structure 76 may be constructed from at least one of a release wall structure 76a with a valve structure 200 (FIG. 7) or a release wall structure 76b with a closure structure 300 (FIG. 8). With both of the valve structure 200 and the closure structure 300 for the release wall structure 76 of the introduction system 10, the configuration may take any appropriate form, as long as the release of vapor producing material from the vapor producing material cavity 72 is fast, almost catastrophic. While, the scope of the invention includes the release wall 74 portion comprising one of a valve structure and a closure structure, a rupture element 80 for the release wall structure 76 is desirable since the release of vapor producing material from the vapor producing material cavity 72 is very fast.

Figure 9:
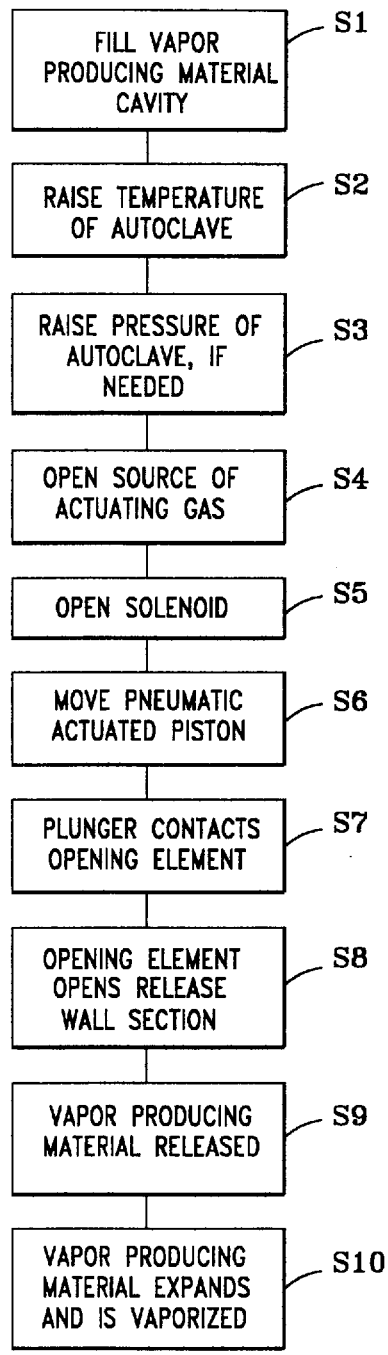
FIG. 9 is a flow chart of an operation of the system, as embodied by the invention.

The operation of the introduction system 10 for the testing autoclave 100 will now be described with reference to the figures, and the flow chart of FIG. 9. For purposes of example, the desired vapor will be steam, however this is merely exemplary and is in no way meant to limit the scope of the invention.

The vapor producing material cavity 72 of the containment vessel 70 is initially filled, in step S1, through the fill unit 78 with the desired vapor producing material, i.e., water. Further, the fill step may be done prior to or after the containment vessel 70 is within the autoclave 100, however it is preferable that the filling be conducted prior to placing the containment vessel 70 in the testing autoclave 100. Thus, the vapor producing material cavity 72 is sealed and in a filled condition with water in the autoclave 100.

When a material, device or system has been placed in the interior of the autoclave 100, and it has been determined to release the contents of the vapor producing material cavity 72, the temperature of the interior of the autoclave 100 is raised, in step S2. This rising of the temperature will cause a release of water to be in the form of steam. Further, if desired, the pressure of the interior of the autoclave 100 can be raised, in step S3, or together with step S2. The pressure $P_A$ in the testing autoclave 100 is less than or equal to the pressure $P_C$ in the containment vessel 70, to assure that the vapor producing material within the containment vessel 70 is released in an expedited fashion.

Next, the source of actuation gas 12 is opened, in step S4, so the actuating gas flows to the solenoid 14. Of course, the source of actuating gas can be opened with the solenoid closed, so the vapor producing material cavity 72 can be filled. However, if these steps are conducted in this manner, care should be taken to assure that the solenoid 14 is closed to prevent movement of the actuating mechanism 20. When the solenoid 14 is opened, in step S5, by the control device 16, the gas passes to the actuating mechanism 20. The gas then moves the pneumatic actuated piston 32 in the bore 26, in step S6. The plunger 34 moves with the pneumatically actuated piston 32, and contacts, in step S7, the opening element 82. The opening element 82 then moves in the bore 26, in step S8, and opens the release wall structure 76 of the containment vessel 70.

As the vapor producing material of the vapor producing material cavity 72 in the containment vessel 70 is released, in step S9, into the interior of the testing autoclave 100, the vapor producing material rapidly expands, in step S10. Accordingly, the vapor producing material undergoes a rapid change in volume. The rapid expansion or change in volume of the vapor producing material is a result of a pressure differential between the containment vessel 70 and the interior of the testing autoclave 100, and further a possible temperature differential between the containment vessel 70 and the interior of the testing autoclave 100 and.

The rapid change in volume permits any remaining vapor producing material in the vapor producing material cavity 72 to rapidly change its state, and flash into a vapor. For example, if the vapor producing material includes water and the interior of the testing autoclave 100 is at a substantially higher temperature steam is formed.

The introduction system 10, as embodied by the invention, has been designed to overcome an internal pressure of the autoclave 100 by providing a large "piston-to-punch" ratio. As an example, and in no way limiting of the invention, by energizing the pneumatic actuated piston 32 with about 450 pounds per square inch of gas pressure, for example, the pneumatic actuated piston 32 will impart a gross load of about 350 pounds upon the opening device 30. The opening device 30, in turn, is driven in the opposite direction, due at least in part to a load provided by the internal pressure of the testing autoclave 100. The resultant force with which the release wall 74 section 76 is opened is in excess of about 314 pounds.

The introduction system 10 can effect a dynamically changing atmosphere to study crack growth of a metallic specimen in a desired atmosphere. As a crack is grown in the desired particular atmosphere, effects upon the growth of the same crack can be studied after the atmosphere has been altered by the introduction system 10.

While the embodiments described herein are preferred, it will be appreciated from the specification that various combinations of elements, variations or improvements therein may be made by those skilled in the art that are within the scope of the invention.

We claim:

1. An introduction system for introducing an atmosphere into an interior of an autoclave so as to alter an existing atmosphere; the introduction system comprising:

at least one source of actuating gas;

a controller that controls a flow of actuating gas from the at least one source of actuating gas;

an actuating mechanism, the actuating mechanism comprising an opening actuator device, the at least one source of actuating gas in communication with the opening actuator device;

a pressure barrier that separates an interior of the autoclave from ambient exterior atmosphere;

a containment vessel that is located at least partially in the interior of the autoclave; the containment vessel comprising:

a vapor producing material cavity;

a plurality of walls, the walls defining the vapor producing material cavity; at least one of the walls comprising a release wall structure of the containment vessel, the release wall structure having a closed condition where the vapor producing material cavity is sealed from the interior of the autoclave and an open position where the a vapor producing material cavity is in communication with the interior of the autoclave; and an opening element; the opening element being movable by the opening actuator device to impart to the release wall structure a movement from the closed condition to the open condition, the release wall structure of the containment vessel being rapidly openable to effect a rapid release of vapor producing material in the vapor producing material cavity into the interior of the autoclave;

wherein when the autoclave is provided with at least one of an increased temperature and pressure and a rapid release of vapor producing material in the vapor producing material cavity into the interior of the autoclave, the vapor producing material vaporizes into a vapor, thus altering an atmosphere in the autoclave.

2. The system according to claim 1, the opening actuator device comprising:

a pneumatically actuated piston and a plunger connected to the pneumatically actuated piston, the pneumatically actuated piston movable by gas from the at least one source of actuating gas to move the plunger;

wherein movement of the plunger causes the opening element to impart to the release wall structure a movement from the closed condition to the open condition, to effect a rapid release of vapor producing material in the vapor producing material cavity into the interior of the autoclave.

3. The system according to claim 2, the opening actuating device comprising a bore, the bore in fluid communication with the source of actuating gas.

4. The system according to claim 3, the pneumatically operated piston being positioned in the bore, the pneumatically operated piston comprising a first plate an intermediate portion and a second plate, the intermediate portion comprising a periphery less than a periphery of each of the first plate and the second plate to define a space, the pneumatically operated piston further comprising at least one seal positioned in the space, wherein the at least one seal contacts walls of the bore, the at least one seal providing for a sliding sealed movement of the pneumatically operated piston in the bore.

5. The system according to claim 4, the plunger connected to the second plate by one of:

integrally forming the plunger and the second plate and releasably attaching the plunger to the second plate.

6. The system according to claim 2, the end of the plunger proximate the opening element being enlarged to cooperate therewith.

7. The system according to claim 1, the controller comprising a control device and a solenoid, the solenoid being openable by the control device to permit a flow of actuating gas from the at least one source of actuating gas to the opening actuator device.

8. The system according to claim 1, the containment vessel further comprising a fill unit that permits the vapor producing material cavity to be filled with at least one vapor producing material.

9. The system according to claim 1, the opening element comprising an elongated element with one end proximate the release wall structure and another end proximate the opening actuator device.

10. The system according to claim 1, the release wall structure comprising a pierceable element and the one end of the opening element comprising a pointed end; wherein upon movement of the opening element, the pointed end of the opening element passes through the pierceable element to provide a path for vapor producing material in the vapor producing material cavity of the containment vessel to an interior of the autoclave.

11. The system according to claim 1, the release wall structure comprising a pierceable element and the one end of the opening element comprising a cruciform-shaped end; wherein upon movement of the opening element, the cruciform-shaped end of the opening element passes through the pierceable element and portions of the pierceable element are maintained away from the opening element to provide a path for vapor producing material in the vapor producing material cavity of the containment vessel to an interior of the autoclave.

12. The system according to claim 1, the release wall structure comprising a pierceable element and the one end of the opening element comprising a through passage from an upper part of the end to a position intermediate the opening element; wherein upon movement of the opening element; the end of the opening element passes through the pierceable element and the through passage provides a flow path across the pierceable to provide a path for vapor producing material in the vapor producing material cavity of the containment vessel to an interior of the autoclave.

13. The system according to claim 1, further comprising a guide structure mounted in a bore in the pressure barrier, the guide structure sealingly guiding a plunger for reciprocating movement.

14. The system according to claim 13, the guide structure mounted in the pressure barrier by at least one of:

threaded engagement; friction fit, welded and mechanically connected in the bore.

15. The system according to claim 1, the opening element comprising an elongated body, the elongated body mounted in a bore in the containment vessel for sliding movement spaced from walls of the bore in the containment vessel by at least one of:

at least one fin on the opening element; and at least one spacer mounted in the bore in the containment vessel.

16. The system according to claim 1, the opening element comprising an elongated element with one end proximate the release wall structure and another end proximate the opening actuator device, the another end being enlarged to cooperate with the opening actuator device.

17. The system according to claim 1, wherein the release wall structure comprises valve means.

18. The system according to claim 1, wherein the release wall structure comprises closure means.

19. The system according to claim 1, wherein the vapor producing material cavity comprises a vapor producing material, the vapor producing material comprising water so an atmosphere in the autoclave is changed with steam produced when the water is released from the vapor producing material cavity into the interior of the autoclave.

20. The system according to claim 1, where the release wall structure comprises one of:

a foil; a disk; a sheet of material and rupture element.

21. The system according to claim 1, where the pressure barrier is one of:

a part of an exterior wall of the testing autoclave and a separate structure connected thereto.

22. The system according to claim 1, where the release wall structure comprises a rupture element, a rupture element holder and a rupture element securing device.

23. The system according to claim 1, where the actuating gas is non-toxic and non-reactive with the introduction system.

24. The system according to claim 1, wherein the actuating gas remains separated from the interior of the autoclave.

* * * * *